US009958281B2

(12) United States Patent
Park et al.

(10) Patent No.: US 9,958,281 B2
(45) Date of Patent: May 1, 2018

(54) SERVICE PROVIDING APPARATUS AND METHOD FOR SUPPORTING CREATION OF ROUTE

(71) Applicant: SK TELECOM CO., LTD., Seoul (KR)

(72) Inventors: Jin Young Park, Seongnam-si (KR); Min Jung Kim, Seongnam-si (KR); Dong Seok Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 47 days.

(21) Appl. No.: 14/967,042

(22) Filed: Dec. 11, 2015

(65) Prior Publication Data
US 2016/0216126 A1  Jul. 28, 2016

(30) Foreign Application Priority Data

Jan. 28, 2015 (KR) .................. 10-2015-0013317

(51) Int. Cl.
| | |
|---|---|
| G01C 21/20 | (2006.01) |
| G01C 21/34 | (2006.01) |
| G01C 21/36 | (2006.01) |
| G08G 1/123 | (2006.01) |
| G08G 1/005 | (2006.01) |
| H04W 4/02 | (2009.01) |
| G06Q 50/30 | (2012.01) |

(52) U.S. Cl.
CPC ..... *G01C 21/3423* (2013.01); *G01C 21/3484* (2013.01); *G01C 21/3626* (2013.01); *G01C 21/3679* (2013.01); *G01C 21/3691* (2013.01); *G01C 21/3697* (2013.01); *G08G 1/005* (2013.01); *G08G 1/123* (2013.01); *H04W 4/02* (2013.01); *H04W 4/027* (2013.01); *G06Q 50/30* (2013.01)

(58) Field of Classification Search
CPC ..... G01C 21/3423; G01C 21/00; G01C 21/20
See application file for complete search history.

(56) References Cited

U.S. PATENT DOCUMENTS

| | | | |
|---|---|---|---|
| 6,421,606 B1 * | 7/2002 | Asai .................. | G01C 21/3423 |
| | | | 701/410 |
| 7,957,871 B1 * | 6/2011 | Echeruo ............. | G01C 21/3423 |
| | | | 104/27 |
| 2010/0153004 A1 * | 6/2010 | Natsume ............... | G01C 21/20 |
| | | | 701/533 |

(Continued)

*Primary Examiner* — Kevin P Mahne
(74) *Attorney, Agent, or Firm* — Hauptman Ham, LLP

(57) ABSTRACT

Provided are service providing apparatus and method for supporting creation of a route, and more particularly, to service providing apparatus and method for supporting creation of a route which supports creation of a personal route for only a user by selecting a transportation up to a destination and positions for getting on and off. According to the present invention, it is possible to ensure expandability of route provision by supporting an optimal route which is known by a user to be directly created by the user when there is no user's desired route among recommended routes, providing the created personalized route together with the recommended route to support the personalized route to be guided as the optimal route, and simultaneously, providing various routes using the public transportation.

5 Claims, 9 Drawing Sheets

(56) References Cited

U.S. PATENT DOCUMENTS

| | | | |
|---|---|---|---|
| 2015/0317582 A1* | 11/2015 | Nath | G06Q 10/06 705/7.13 |
| 2016/0187148 A1* | 6/2016 | Unger | G01C 21/3461 701/400 |
| 2016/0216126 A1* | 7/2016 | Park | G08G 1/123 |

* cited by examiner

SERVICE PROVIDING APPARATUS AND METHOD FOR SUPPORTING CREATION OF ROUTE

CROSS-REFERENCE TO RELATED APPLICATION

This application claims the benefit of Korean Application No. 10-2015-0013317 filed on Jan. 28, 2015 with the Korean Intellectual Property Office, the disclosure of which is incorporated herein by reference.

BACKGROUND OF THE INVENTION

1. Field of the Invention

The present invention relates to service providing apparatus and method for supporting creation of a route, and more particularly, to service providing apparatus and method for supporting creation of a route which supports a personalized route for only a user to be created by selecting a transportation up to a destination and positions for getting on and off.

2. Description of the Related Art

At present, a user can be guided with an optimal route using public transportation and walking as well as an optimal route using a car up to a destination by using a user apparatus which can receive a navigation service through supporting abundant map information and traffic information provided in association with a navigation and various algorithms having high efficiency, which are used for calculating an optimal route.

In particular, in providing the route using the public transportation, the existing navigation service can return the optimal route desired by the user by considering various conditions including transfer, time, cost, and the like at the time of calculating a route up to the destination.

However, since the existing navigation service calculates the route by depending on limited map information, an optimal route experienced or determined by the user may not be calculated through the navigation service and a service that can separately store a personalized route determined by the user is not provided, and as a result, there is inconvenience in that the user cannot help autonomously memory the route when the user intends to use the personalized route.

Accordingly, enhancement of a function which supports the user to autonomously create the personalized route and store and service the created personalized route is required.

SUMMARY OF THE INVENTION

An object of the present invention is to provide service providing apparatus and method for supporting creation of a route for providing expandability of creation of the route and improving user's convenience by supporting a personalized route to be created by selecting a transportation means up to a destination and get-on and get-off positions to directly set a desired route of the user and storing the created personalized route to support a service when the user visits the same destination.

Further, another object of the present invention is to provide service providing apparatus and method for supporting creation of a route for supporting a personalized route for only a user to be easily created by automatically tracing a transportation means which is used by the user up to the destination and get-on and get-off positions to automatically create the route.

Furthermore, yet another object of the present invention is to provide service providing apparatus and method for supporting creation of a route for ensuring expandability of creation of the route by supporting the personalized route created by the user to be recommended to other users and providing the corresponding personalized route as a basic recommended route when a use frequency of other users using the corresponding personalized route is more than a predetermined level.

According to an aspect of the present invention, a service providing apparatus for supporting creation of a route includes: a public transportation information providing unit configured to provide line number information for one or more public transportation means which stop at respective adjacent stations in a predetermined range based on the departure point input through a user interface by referring to map information and public transportation information which are prestored; and a route creating unit configured to sequentially creating one or more unit route information by matching selected line number information until a distance or a time measured based on walking from a get-off station to a destination is less than a predetermined reference value after creating get-on station information and get-off station information based on line information included in the selected line number information selected in the line number information, the adjacent station, and the destination and create personalized route information on a route between the departure point and the destination by using unit route information and walking route information after generating the remaining unit route except for the unit route information as the walking route information.

In an embodiment of the present invention, the route creating unit may receive edition information created in order to delete at least one of unit route information included in the personalized route information or change at least one of the selected line number information, the get-on station information, and the get-off station information based on the user input through the user interface and change the personalized route information based on the edition information.

In an embodiment of the present invention, the service providing apparatus for supporting creation of the route may further include a route recommending unit configured to match and store the personalized route information with personal information of the user apparatus provided by the user interface when creating the personalized route information and provide the personalized route information to the user apparatus and a plurality of different user apparatuses which select the departure point and the destination.

In an embodiment of the present invention, the route recommending unit may measure a use frequency by receiving information on whether to use the personalized route information from the user apparatus and the plurality of different user apparatuses and provide the personalized route information as recommended route information prior to other routes to the user apparatus selecting the departure point and the destination when the use frequency is more than a predetermined value.

According to another aspect of the present invention, a service providing apparatus for supporting creation of a route includes: a position information providing unit configured to provide position information by determining a current position of a user; a public transportation information providing unit configured to provide line number information for one or more public transportation means corresponding to respective stations through a user interface by referring to map information; and a route creating unit configured to create walking route information by determine as walking a case where a speed is less than a predetermined speed based on a change in the position information, create unit route information matched with selected line number information by determining a get-on station and a get-off station through line information included in the selected line number information selected in the line number information corresponding to each adjacent station in the predetermined range and the position information based on a current position through the public transportation information providing unit at the time when there is no change in position for a predetermined time or more or a change in speed for a predetermined time is more than a predetermined reference value, and automatically create the personalized route information by connecting the different walking route information and the unit route information according to the creation order.

In an embodiment of the present invention, the route creating unit may create get-on station information on a station included in the line information among the most adjacent stations to the current position measured at the time and create the most adjacent station to the position provided through the position information providing unit among the stations included in the line information as get-off station information at the time when a difference between a route according to the line information and a movement route according to the position information is generated.

In an embodiment of the present invention, the route creating unit may create any one of the get-on station information and the get-off station information through an AP installed in the station.

In an embodiment of the present invention, the public transportation information providing unit may provide driving information for each public transportation means, and the route creating unit may create the get-on station information and the get-off station information based on the position information and the driving information for each public transportation means.

In an embodiment of the present invention, the route creating unit may automatically select line number information corresponding to line information coinciding with movement route information calculated based on the position information provided through the position information providing unit in the line information of the line number information provided through the public transportation information providing unit at the time.

According to yet another aspect of the present invention, a service providing method for supporting creation of a route includes: providing a user interface for creating a route between a departure point and a destination to a user apparatus by means of a service providing apparatus for supporting creation of the route; providing line number information for one or more public transportation means passing through respective adjacent stations in a predetermined range based on the departure point input through the user interface by referring to map information by means of the service providing apparatus for supporting creation of the route; sequentially creating one or more unit route information by matching selected line number information until a distance or a time measured based on walking from a get-off station to a destination is less than a predetermined reference value after creating get-on station information and get-off station information based on line information included in the selected line number information selected in the line number information, the adjacent station, and the destination; and creating personalized route information on a route between the departure point and the destination by using unit route information and walking route information after generating the remaining unit route except for the unit route information as the walking route information by means of the service providing apparatus for supporting creation of the route.

As described above, according to the present invention, it is possible to ensure expandability of route provision by supporting an optimal route which is known by a user to be directly created by the user when there is no user's desired route among recommended routes according to a route request of the user, providing the created personalized route together with the recommended route to support the personalized route to be guided as the optimal route, and simultaneously, providing various routes using the public transportation.

Further, it is possible to create a personalized route optimized to a movement route of a user while automatically tracing a position of the user and provide convenience for creating the personalized route.

Furthermore, it is possible to provide an optimized route to the user by supporting a personalized route for only a user to be created, supporting a personalized route created by different users to be shared between a plurality of users, and registering and using a route having a high use frequency as a recommended route and provide a best route to the user by ensuring various route.

DETAILED DESCRIPTION OF THE PREFERRED EMBODIMENTS

Figure 1:
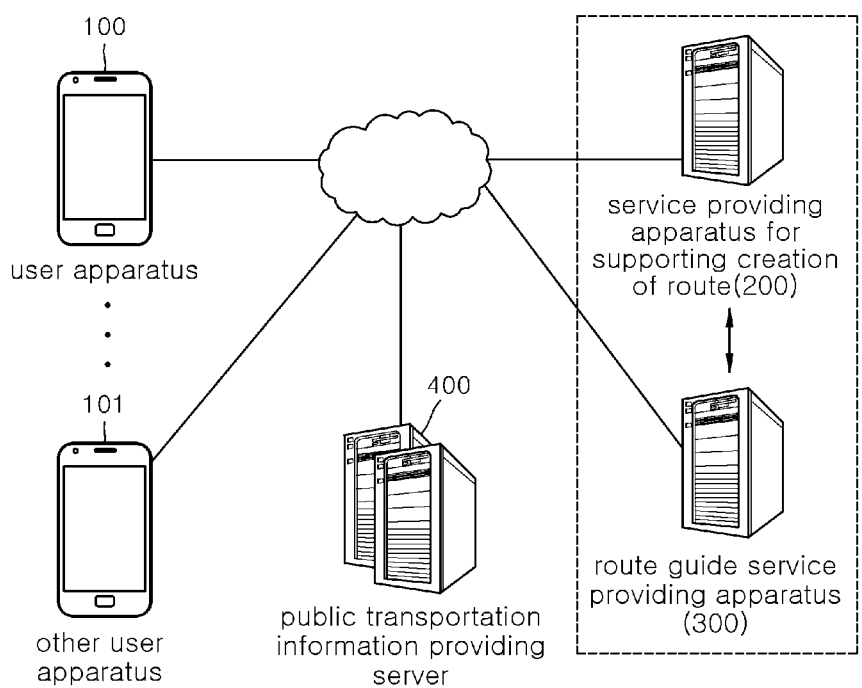
FIG. 1 is a configurational environment diagram of a service providing system for supporting creation of a route according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a configurational diagram of a service providing system for supporting creation of a route according to an embodiment of the present invention, and as illustrated in FIG. 1, the service providing system may include a service providing apparatus 200 for supporting creation of the route and a route guide service providing apparatus 300, which communicates with a plurality of user apparatuses 100 and 101 via a communication network.

In this case, the user apparatus 100 may include various terminals such as a smart phone, a portable terminal, a mobile terminal, a personal digital assistant (PDA), a portable multimedia player (PMP), a telematics terminal, a navigation terminal, a personal computer, a laptop computer, a slate PC, a tablet PC, an ultrabook, a wearable device (for example, including a smartwatch, a smart glass, a head mounted display (HMD), and the like), a Wibro terminal, an internet protocol television (IPTV) terminal, a smart TV, a digital broadcasting terminal, an audio video navigation (AVN) terminal, an audio/video (A/V) system, and a flexible terminal.

Further, the service providing apparatus 200 for supporting creation of the route and the route guide service providing apparatus 300 may be constituted by a server, and may support monitoring and controlling of the entire network, connection with a main frame or another network via a public network, or sharing of a software source or a hardware source.

As an example, the service providing apparatus 200 for supporting creation of the route and the route guide service providing apparatus 300 may be implemented by a web server, a database server, a proxy server, or the like. Further, in each of the service providing apparatuses 200 and 300, one or more of various software which allows a network load distribution mechanism to a service device to operate on the Internet or other networks may be installed, and as a result, each of the service providing apparatuses 200 and 300 may be implemented by a computerized system. Further, the network may be an http network and may be a private line, intranet, or any other networks. Furthermore, each of the service providing apparatuses 200 and 300 and the user apparatus 100 may be connected to each other by a security network so as to suppress the network from being attached by any hacker or other third parties. Further, each of the service providing apparatuses 200 and 300 may include a plurality of database servers, and the database server may be implemented to be separately connected with each of the service providing apparatuses 200 and 300 through any type of network connection including a distributed database sever architecture.

Furthermore, the service providing apparatus 200 for supporting creation of the route, the route guide service providing apparatus 300, the user apparatus 100, and a public transportation information providing server 400 may communicate with each other via a wired/wireless communication network. As an example of the wireless communication network, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), wireless mobile broadband service (WMBS), Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, or the like. Further, the wired communication network may include power line communication (PLC), USB communication, Ethernet, serial communication, optical/coaxial cable, or the like.

According to the aforementioned configuration, the route guide service providing apparatus 300 may be constituted to guide a route by receiving departure point and destination information from the user apparatus 100, creating route information on a departure point according to departure point information and a destination according to destination information using at least one of a car, a public transportation, and walking, and then transmitting the created route information to the user apparatus 100.

In this case, the route guide service providing apparatus 300 may provide link information on the service providing apparatus 200 for supporting creation of the route which supports a user corresponding to the user apparatus 100 to create a direct route when providing the route information, in addition to the route information.

Accordingly, when the user selects the corresponding link information in the user apparatus 100 receiving the route information because a user's desired route does not exist, the user apparatus 100 may access the service providing apparatus 200 for supporting creation of the route. In this case, of course, the user apparatus 100 may directly access the service providing apparatus 200 for supporting creation of the route without passing through the link information.

Meanwhile, the service providing apparatus 200 for supporting creation of the route provides a user interface to create a personalized route for only the user with respect to the accessed user apparatus 100 and may create personalized route information corresponding to a route which is set by the user through the corresponding user interface.

In this case, the user interface may be constituted by a graphic user interface (GUI), and the service providing apparatus 200 for supporting creation of the route transmits data for the corresponding GUI to the user apparatus 100 to load the GUI.

In this case, the service providing apparatus 200 for supporting creation of the route may receive public transportation information including line number information by communicating with the public transportation information providing server 400 which provides line number information including line information on a driving line according to the line number of a public transportation means such as a bus and a subway via the communication network and driving information on a departure point time, an arrival time, and the like for each station, and the like, via the communication network. The service providing apparatus 200 for supporting creation of the route may support a route setting using a public transportation by providing the line number information to the user apparatus 100 when creating the personalized route information based thereon.

As described above, the present invention may support a personalized route for an optimized route to be created when the user knows an optimized route faster than a recommended route provided in the route guide service providing apparatus 300 and easily provide the optimized route to the user by providing the corresponding personalized route through the route guide service providing apparatus 300 in addition to another recommended route when information on a departure point and a destination corresponding to the personalized route is received from the user apparatus 100 below.

Meanwhile, in the aforementioned configuration, of course, the service providing apparatus 200 for supporting creation of the route may be constituted as one device (for example, a server) with the route guide service providing apparatus 300.

Figure 2:
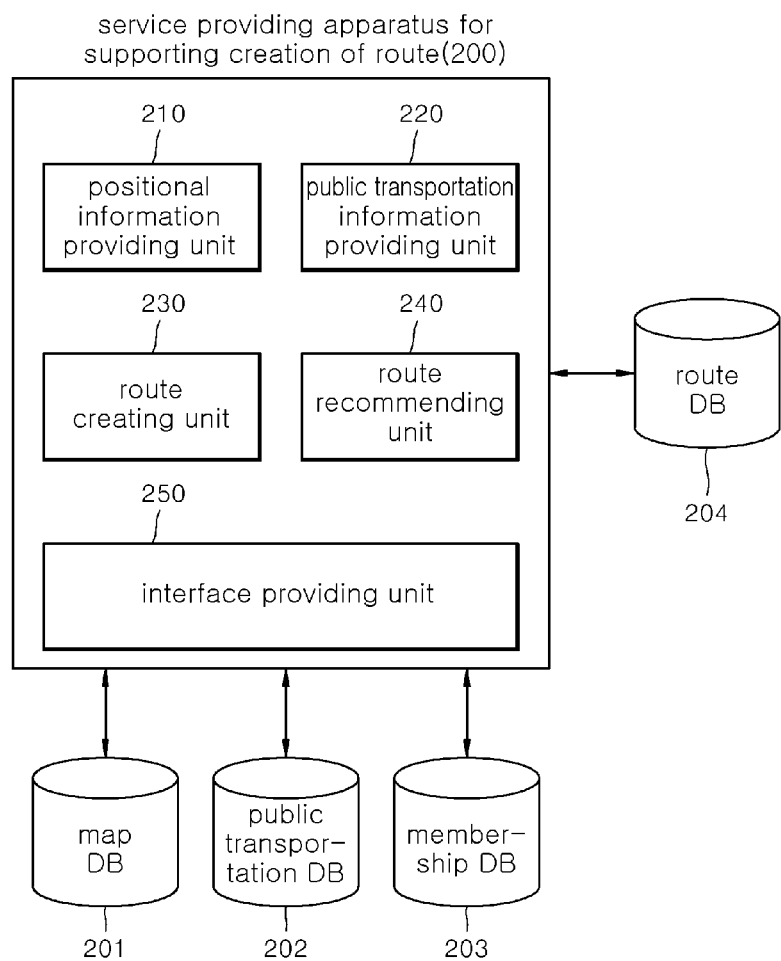
FIG. 2 is a detailed configurational diagram of a service providing apparatus for supporting creation of the route according to the embodiment of the present invention.

FIG. 2 is a detailed configurational diagram of the service providing apparatus 200 for supporting creation of the route according to the embodiment of the present invention. As illustrated in FIG. 2, the service providing apparatus 200 for supporting creation of the route may include a position information providing unit 210, a public transportation information providing unit 220, a route creating unit 230, a route recommending unit 240, and an interface providing unit 250.

When describing each constituent element in detail, first, the interface providing unit 250 may provide data for the user interface for directly setting the route by the user from the user apparatus 100 or the route guide service providing apparatus 300 to the user apparatus 100 and receive departure point information corresponding to the departure point and destination information corresponding to the destination which are input through the corresponding user interface, from the user apparatus 100.

Further, the public transportation information providing unit 220 may store the public transportation information including line number information on line numbers of one or more public transportation means including a subway, a bus, and the like which is received from the aforementioned public transportation information providing server 400 in a public transportation DB 202 and extract the line number information from the public transportation information stored in the public transportation DB 202 to transmit the extracted line number information to the user apparatus 100.

Accordingly, the user apparatus 100 may provide the line number information received from the service providing apparatus 200 for supporting creation of the route through the user interface.

In this case, the public transportation information providing unit 220 identifies one or more adjacent stations in a predetermined range based on the departure point by referring to map information stored in a map DB 201 and transmits the line number information on the line numbers for one or more public transportation means which stops at each adjacent station to the user apparatus 100 to provide the transmitted line number information through the user interface.

Accordingly, the route creating unit 230 may receive selected line number information on any one of one or more line number information provided through the user interface from the user apparatus 100, create get-on station information by determining an adjacent station included in the line information among the adjacent stations according to the line information included in the selected line number information as a get-on station, and create get-off station information by determining the most adjacent station to the destination among the stations included in the line information as a get-off station.

In this case, of course, the route creating unit 230 may create the get-on station information, the get-off station information, and the selected line number information by receiving user input information from the user apparatus 100 through the user interface provided to the user apparatus 100.

Further, each of the get-on station information and the get-off station information may include position information on the get-on station or the get-off station on the map information, and the line information may include information on a driving line including a moving route, stations, and the like of the public transportation means having a specific line number.

Further, the route creating unit 230 matches the get-on station information and the get-off station information with the selected line number information to create unit route information including the get-on station information, the get-off station information, and the selected line number information.

In this case, the route creating unit 230 may measure a distance or a time according to walking movement from the get-off station to the destination according to the get-off station information included in the unit route information by referring to the map information when creating the unit route information, set the get-off station as the departure point by interlocking with the public transportation information providing unit when the measured distance or time is more than a predetermined reference value, and provide line number information corresponding to each adjacent station in the predetermined range based on the departure point (the get-off station) to the user apparatus 100.

As a result, the route creating unit 230 may create additional unit route information which sets the get-off station as the departure point by the same method as the creation process of the unit route information.

Further, of course, the route creating unit 230 may create different additional unit route information as described above when a distance or a time according to walking movement from the get-off station to the destination according to the get-off station information included in the additional unit route information is more than the predetermined reference value.

Accordingly, the route creating unit 230 may sequentially connect one or more additional unit route information subsequently to the unit route information according to the order of creation.

Figure 5:
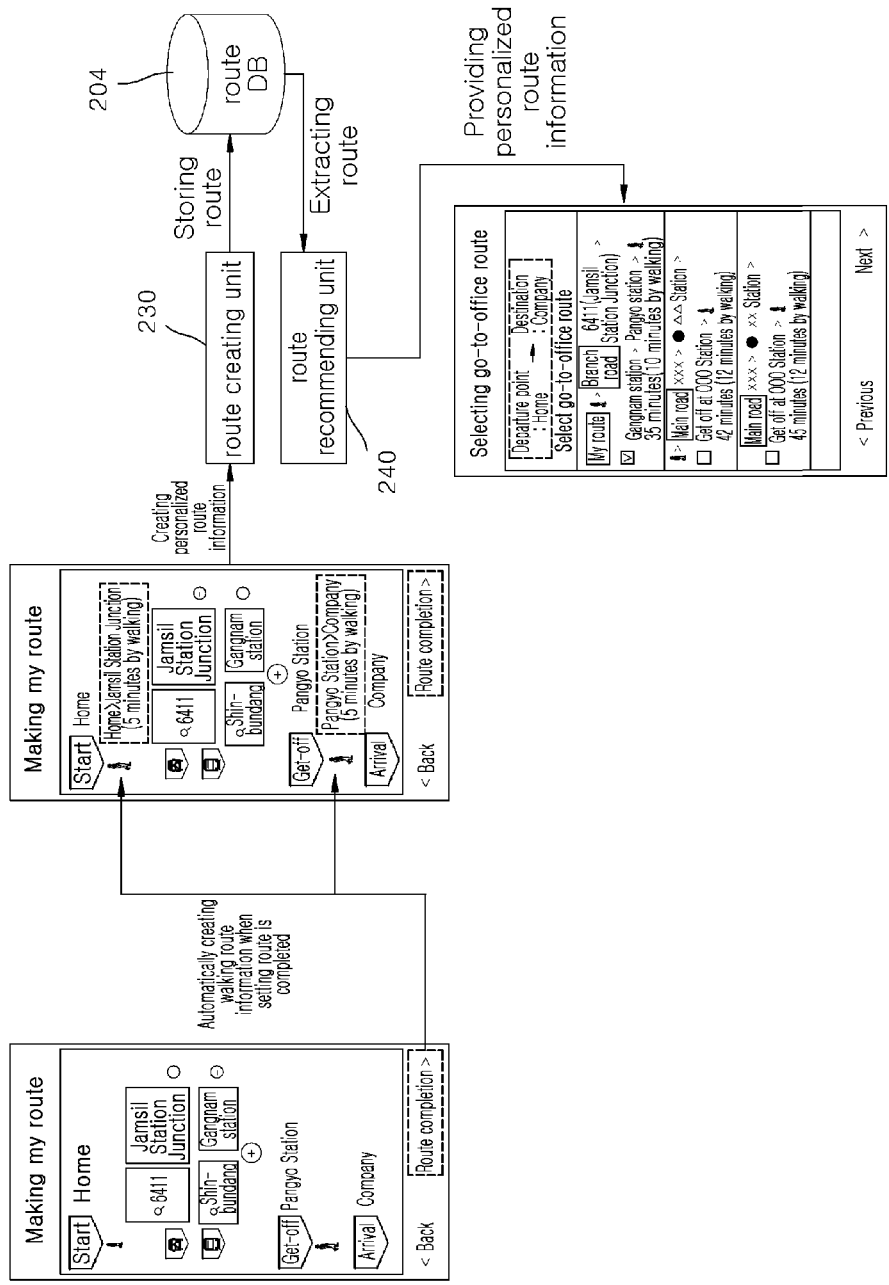
FIG. 5 is an exemplary diagram for creating and providing personalized route information of the service providing apparatus for supporting creation of the route according to the embodiment of the present invention.

Meanwhile, the route creating unit 230 may create personalized route information on a route between the departure point and the destination according to the departure point information and the destination information by create walking route information calculated based on the walking with the remaining routes which are not connected through at least one of the unit route information and the additional unit route information as illustrated in FIG. 5, when a distance or a time according to walking movement from the get-off station to the destination according to any one of unit route information and additional unit route information which are created the last is less than the predetermined reference value.

Thereafter, the route creating unit 230 extracts personal information corresponding to the user apparatus 100 from a membership DB 203 and then matches the extracted personal information with the personalized route information to store the matched personal information in the route DB 204.

Meanwhile, the route recommending unit 240 may extract personalized route information corresponding to the departure point and the destination set with respect to the user apparatus 100 setting the departure point and the destination by accessing the route guide service providing apparatus 300 to provide the extracted personalized route information to the user apparatus 100 through the route guide service providing apparatus 300 together with the recommended route or directly provide the personalized route information to the user apparatus 100 via the communication network.

As a result, the user receiving the personalized route information through the user apparatus 100 may receive guidance of the route by using the directly created personalized route information in addition to the recommended route and receive guidance of an optimized route.

Figure 3:
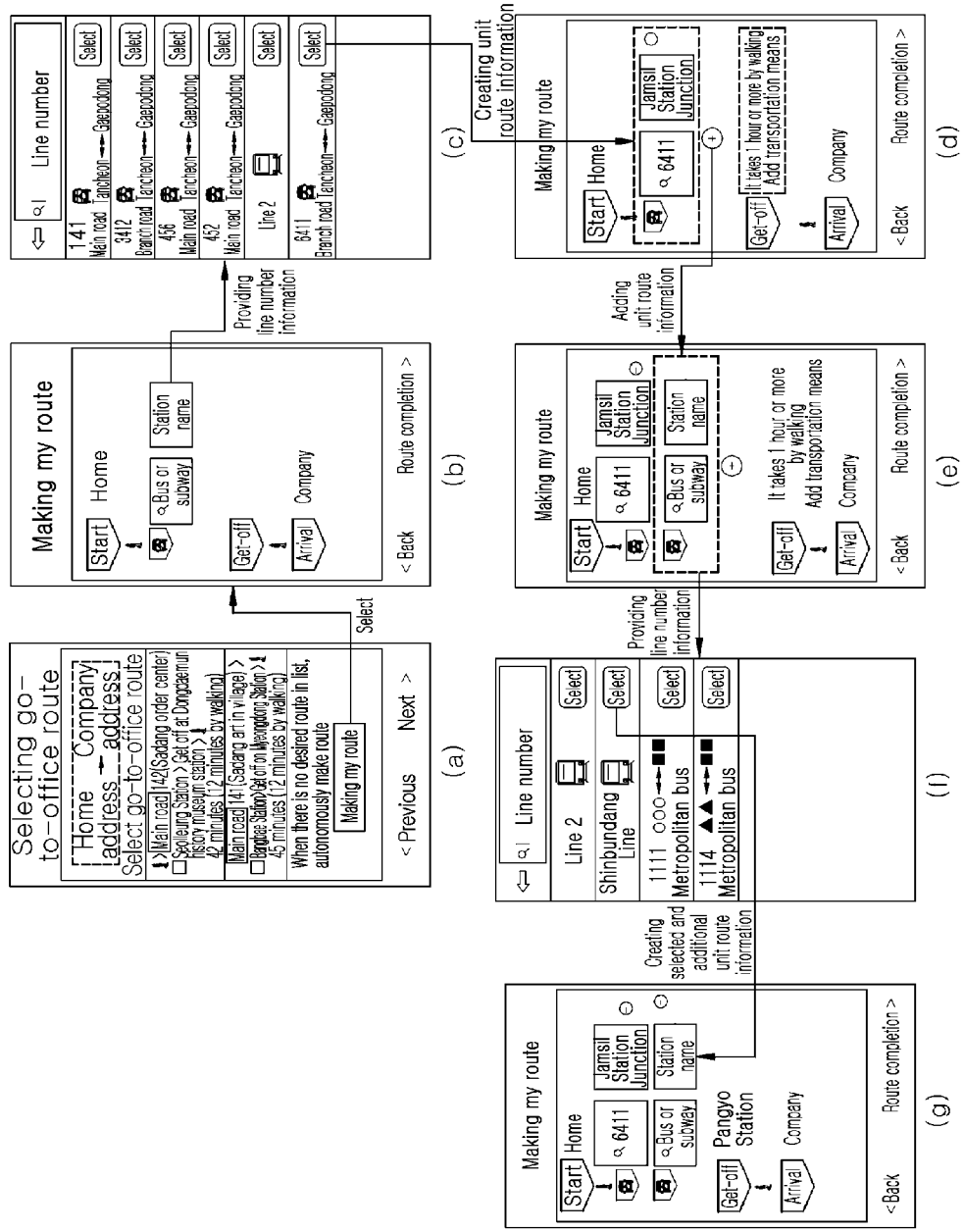
FIG. 3 is an operational exemplary diagram of the service providing apparatus for supporting creation of the route according to the embodiment of the present invention.

FIG. 3 is an exemplary diagram of a detailed embodiment of a route creation support of the service providing apparatus 200 for supporting creation of the route according to the aforementioned configuration. As illustrated in FIG. 3A, the route guide service providing apparatus 300 may create recommended route information on the recommended route connecting the departure point according to the departure point information and the destination according to the destination information by receiving the departure point information and the destination information from the user apparatus 100 and transmit link information for accessing the service providing apparatus 200 for supporting creation of the route which supports a route connecting a departure point and a destination which are directly desired by the user in addition to the recommended route information to the user apparatus 100.

Accordingly, the user apparatus 100 may access the service providing apparatus 200 for supporting creation of the route through the link information or directly access the service providing apparatus 200 for supporting creation of the route via the communication network when there is no desired route in the recommended route information.

Meanwhile, with respect to the user apparatus 100 accessing the service providing apparatus 200 for supporting creation of the route, the interface providing unit 250 may transmit information on the user interface for creation of the route to the user apparatus 100 as illustrated in FIG. 3B, and as a result, the user apparatus 100 may provide a user interface for directly creating an optimized route by the user by receiving the corresponding information.

Further, the interface providing unit 250 may receive the departure point information and the destination information from the user apparatus 100 to provide the received departure point information and destination information to the public transportation information providing unit 220 and the route creating unit 230 or receive the departure point information and the destination information from the route guide service providing apparatus 300 to provide the departure point information and the destination information to the public transportation information providing unit 220 and the route creating unit 230.

Figure 4:
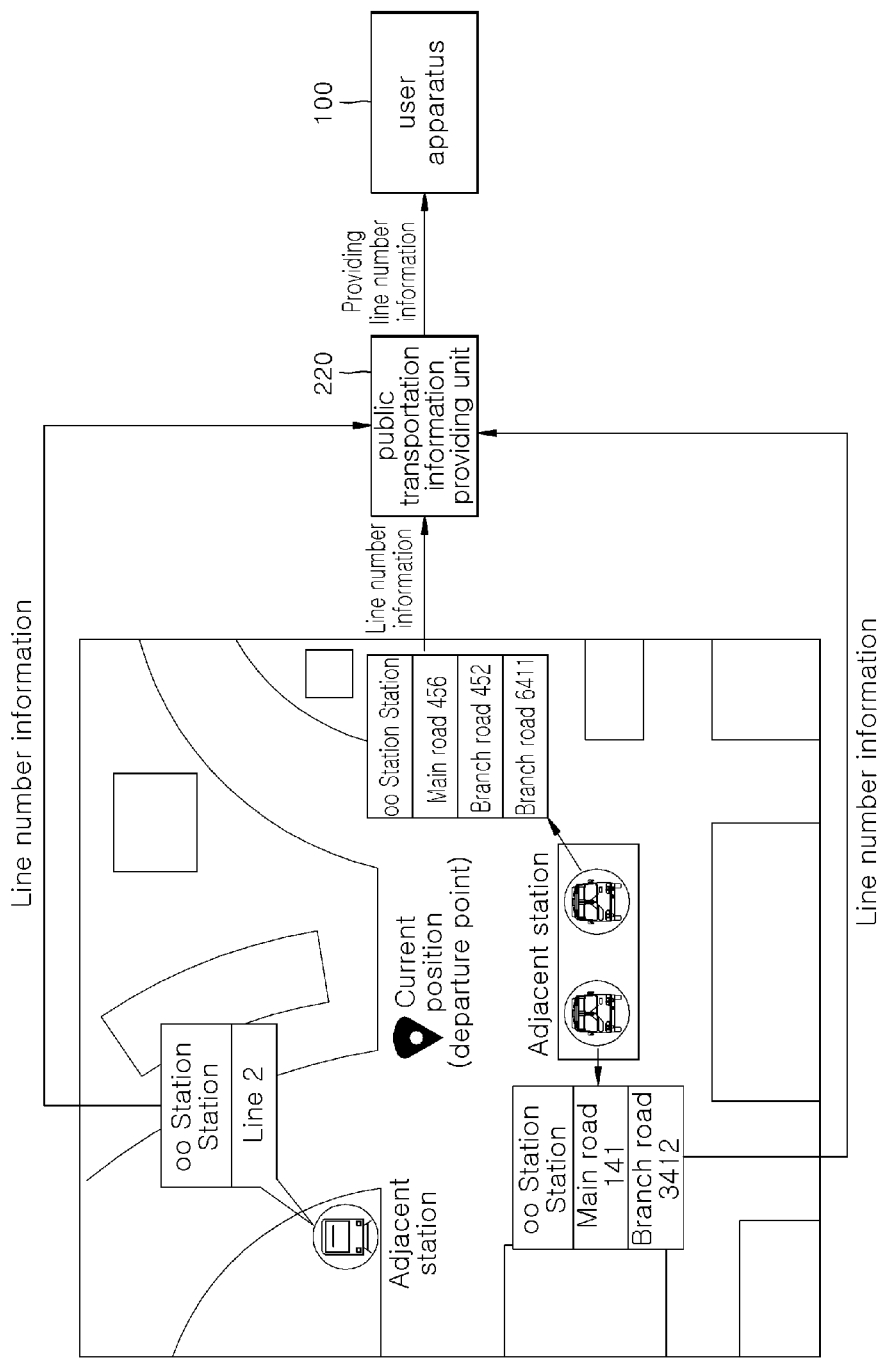
FIG. 4 is an exemplary diagram for a line number providing process of the service providing apparatus for supporting creation of the route according to the embodiment of the present invention.

Accordingly, the public transportation information providing unit 220 loads the map information stored in the map DB 201 as illustrated in FIG. 4, retrieves one or more adjacent stations positioned in the predetermined range based on the departure point according to the departure point information in the map information, and extracts line number information on the line numbers for one or more public transportation means passing through the retrieved adjacent stations from the public transportation DB 202 to provide the extracted line number information to the user apparatus 100 as illustrated in FIG. 3C.

Meanwhile, the route creating unit 230 receives the selected line number information on the line number selected from the line number information provided to the user apparatus 100 from the user apparatus 100 and may create get-on station information by determining a station coinciding with any one of the adjacent stations which are retrieved through the public transportation information providing unit 220 in the line information included in the selected line number information as the get-on station.

As an example, in FIG. 3C, the public transportation information providing unit 220 provides line number information on a bus or a subway passing through the adjacent stations, and the route creating unit 230 may receive selected line number information on a bus having line number 6411 which is a line number selected by the user apparatus 100 in the line number information.

Further, the route creating unit 230 may create get-on station information by determining a station coinciding with the station included in the line information among the adjacent stations retrieved through the public transportation information providing unit 220 as the get-on station based on the line information on the line route of '6411' included in the selected line number information when receiving the selected line number information.

Accordingly, as illustrated in FIG. 3D, the route creating unit 230 may match get-on station information on 'Jamsil Station Junction' which is a get-on station coinciding with any one of the stations included in the line information of a bus number 6411 among the adjacent stations with selected line number information on the bus of number 6411.

Meanwhile, the route creating unit 230 may determine the more adjacent station to the destination information among the stations of the bus number 6411 as the get-off station by referring to the map information and the line information, create get-off station information on the get-off station to match the created get-off station information with the selected line number information on the bus number 6411, and create unit route information in which the elected line number information, the get-on station information, and the get-off station information are matched with each other.

In this case, of course, the route creating unit 230 may directly receive the get-off station information on the get-off station from the user apparatus 100 to match the received get-off station information with the selected line number information.

Further, the route creating unit 230 may create one or more walking route information by operating a distance or a time according to the walking movement from the get-off station to the destination to calculate the distance or the time based on the walking corresponding to the remaining unit route except for the unit route information when the calculated distance or time is less than the predetermined reference value, and create personalized route information on a route between the departure point and the destination according to the departure point information and the destination information, which is constituted by the walking route information and the unit route information.

Meanwhile, the route creating unit 230 may create additional unit route information when the distance or the time according to the walking movement from the get-off station to the destination is less than the predetermined reference value.

As an example, as illustrated in FIG. 3E, the route creating unit 230 may set the get-off station according to the get-off station information as the destination using when creating the unit route information by interlocking the public transportation information providing unit 220, retrieve a get-off station or adjacent stations in the predetermined range based on the get-off station, and provide line number information corresponding to the retrieved adjacent stations to the user apparatus 100.

Accordingly, the route creating unit 230 receives selected line number information like the creation process of the unit route information, and may create additional unit route information including selected line number information, get-on station information, and get-off station information, which is different from the unit route information, by determining a get-on station coinciding with the station included in the line information included in the selected line number information among the adjacent stations and the most adjacent get-off station to the destination.

For example, as illustrated in the drawing, the route creating unit 230 sets the 'Jamsil Station junction' which is the get-off station of the unit route information as the departure point, retrieve adjacent stations in the predetermined range in the map information based on the 'Jamsil Station junction' by interlocking the public transportation information providing unit 220, and extract line number information on at least one of a subway and a bus corresponding to each adjacent station from the public transportation DB 202 to provide the extracted line number information to the user apparatus 100.

Accordingly, as illustrated in FIG. 3F, the route creating unit 230 may determine the get-on station as 'Gangnam station' by comparing line information of 'Shinbundang Line' and the adjacent station when receiving selected line number information on the 'Shinbundang Line' which is a subway line from the user apparatus 100 and determine 'Pangyo station' which is the most adjacent station to the destination as the get-off station. As illustrated in FIG. 3G, the route creating unit 230 may create additional unit route information in which the 'Gangnam station' as the get-on station information, the 'Pangyo station' as the get-off station information, and the 'Shinbundang Line' as the subway line number are matched with each other.

Meanwhile, as illustrated in FIGS. 3G and 5, the route creating unit 230 may subsequently connect the additional unit route information to the unit route information, and may create walking route information by calculating the remaining unit route except for the unit route information and the additional unit route information based on the walking when the distance or the time according to the walking movement from the get-off station to the destination according to the additional unit route information is less than the predetermined reference value to create the walking route information and create personalized route information constituted by at least one of the unit route information and the additional unit route information and one or more walking route information.

In this case, of course, the route creating unit 230 creates different additional unit route information when the distance or the time according to the walking movement from the get-off station to the destination according to the additional unit route information is more than the predetermined reference value to subsequently connect the created different additional unit route information to the pre-created additional unit route information.

As such, the route creating unit 230 may create one or more unit route information connecting the departure point and the destination according to the departure point information and the destination information until the distance or the time according to the walking movement from the get-off station to the destination is less than the predetermined reference value, and connect the unit route information in sequence according to the creation order and create walking route information on a walking movement route by calculating the route connecting each station included in the unit route information and the departure point and the destination based on the walking to create personalized route information constituted by one or more walking route information and the unit route information.

Thereafter, the route creating unit 230 may match the personalized route information with the personal information corresponding to user apparatus 100 and store the matched personalized route information in the route DB 204.

Meanwhile, the route recommending unit 240 may extract the personalized route information corresponding to the departure point information and the destination information from the route DB 204 in which the personalized route information is stored to transmit the extracted personalized route information to the user apparatus 100 when receiving the departure point information and the destination information according to a route request of the user apparatus 100 from the route guide service providing apparatus 300.

As a result, as illustrated in FIG. 5, the personalized route information may be provided in addition to the recommended route information provided through the route guide service providing apparatus 300.

As described above, the service providing apparatus 200 for supporting creation of the route according to the embodiment of the present invention may support the user to directly create the optimal route which is known by the user when there is no user's desired route among routes recommended in the route guide service providing apparatus 300 providing a route guidance service, support the optimal route to be guided by providing the created personalized route together with the recommended route, and simultaneously, may provide various routes using the public transportation and ensure expandability of the route provision.

Meanwhile, the service providing apparatus 200 for supporting creation of the route according to the embodiment of the present invention supports the personalized route for only the user to be created by tracing a movement route of the user, and an embodiment thereof will be described in detail with reference to the following drawings.

Figure 6:
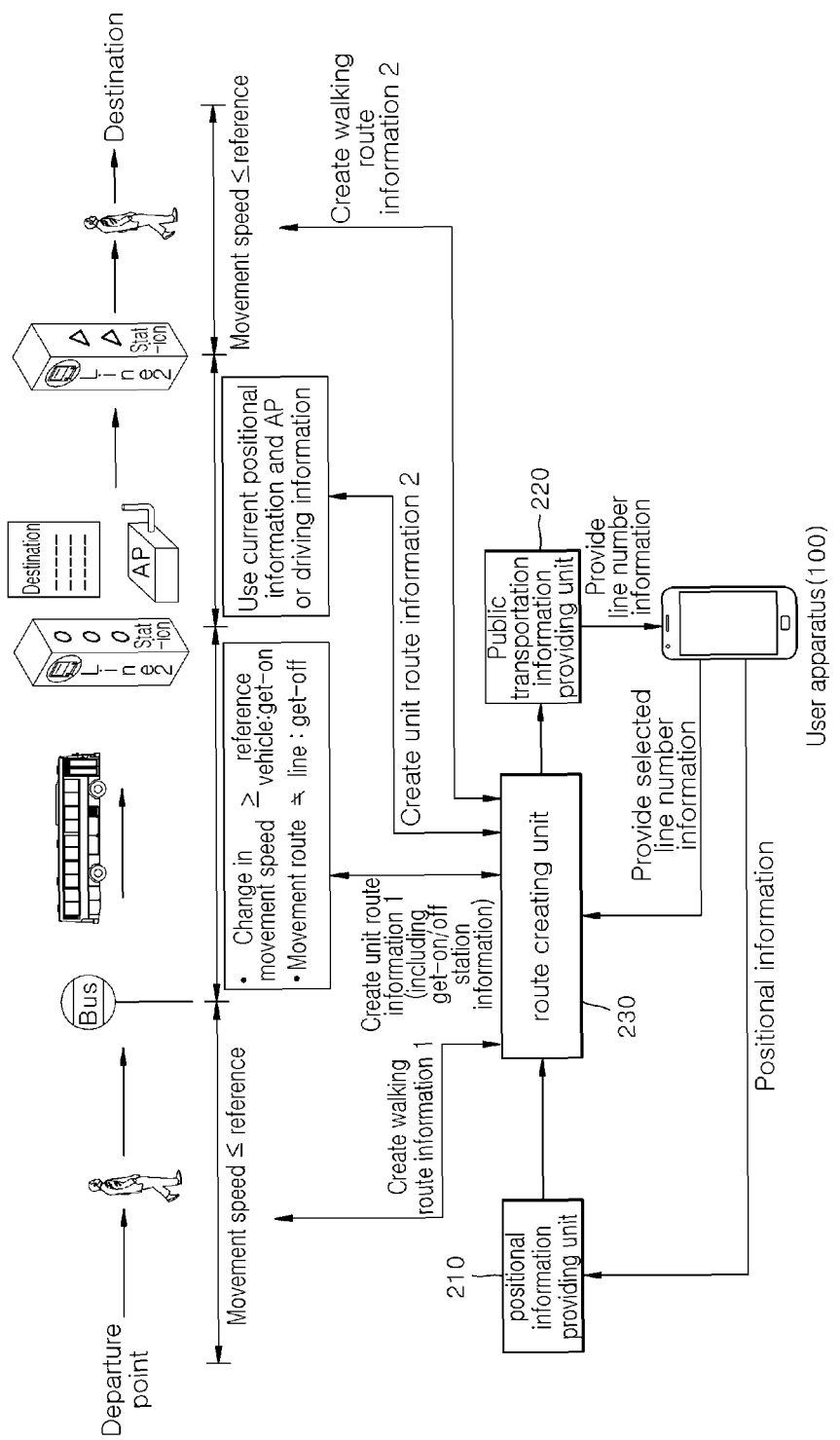
FIG. 6 is an exemplary diagram illustrating an automatic creation process for the personalized route information of the service providing apparatus for supporting creation of the route according to the embodiment of the present invention.

As illustrated in FIG. 6, the service providing apparatus 200 for supporting creation of the route further include the position information providing unit 210, and the position information providing unit 210 creates position information by determining a current position of the user apparatus 100.

The interface providing unit 250 receives the departure point information and the destination information as described above and may provide a user interface for creating the personalized route information through the user apparatus 100.

Accordingly, the interface providing unit 250 provides the received departure point information and destination information to the route creating unit 230 when receiving the departure point information and the destination information for creating the personalized route information and the route creating unit 230 may trace the movement route of the user for creating the personalized route information.

The route creating unit 230 measures a movement speed according to a position change by interlocking with the position information providing unit 210 when receiving the departure point information and may create walking route information by determining the movement as the walking when the measured movement speed is less than a predetermined reference speed.

Thereafter, the route creating unit 230 may determine a get-on time when there is no position change of more than the predetermined time because the user moves from the departure point to arrive at a bus station or a subway station or when a speed change for a predetermined time exceeds the predetermined reference speed as the speed rapidly increases because the user gets on the bus or the subway, based on the position change measured by interlocking with the position information providing unit 210.

Accordingly, the route creating unit 230 identifies one or more adjacent stations positioned in the predetermined range by referring to the map information based on the position at the corresponding get-on time as illustrated in FIG. 4, extracts the line number information corresponding to the adjacent stations by interlocking with the public transportation information providing unit 220 from the public transportation DB 202 to transmit the extracted line number information to the user apparatus 100, and provide the line number information through the user interface loaded in the user apparatus 100.

Next, the route creating unit 230 may create get-on station information by setting the adjacent station coinciding with the station included in the line information as the get-on station based on the line information included in the selected line number information selected according to the user selection in the line number information.

Further, the route creating unit 230 may determine as getting-off a time when a difference between the route according to the line information and the movement route according to current position information is generated based on the position information provided from the position information providing unit 210 with respect to the user which is moving by getting on the bus and the subway to create the most adjacent station to the current position measured through the position information providing unit 210 among the stations included in the line information at the current time as the get-off station information.

In this case, the route creating unit 230 may receive at least one of the get-on station information and the get-off station information from the user apparatus 100 receiving the get-on station information and the get-off station information through an access point (AP) installed in the station.

Further, the public transportation information providing unit 220 provides driving information for each public transportation means, and the route creating unit 230 determines the get-on station and the get-off station based on the position information and the driving information for each public transportation means to create the get-on station information and the get-off station information.

Furthermore, the route creating unit 230 may calculate the movement route by accumulatively storing the position information provided through the position information providing unit 210 at the get-on time determined as the get-on in the aforementioned configuration and automatically select line number information corresponding to line information coinciding with the movement route information calculated by accumulating the line information of the line number information provided through the public transportation information providing unit 220 and the position information provided through the position information providing unit 210.

As a result, the route creating unit 230 automatically selects the line number coinciding with the movement route of the user without providing the line number information to the user apparatus 100 to create the selected line number information.

Meanwhile, the route generating unit 230 matches the get-on station information and the get-off station information with the selected line number information when creating the get-off station information to create unit route information including the get-on station information, the get-off station information, and the selected line number information.

Thereafter, the route generating unit 230 may create different walking route information or different unit route information according to the aforementioned configuration based on the position information provided through the position information providing unit 210 when the user continuously moves while the user does not arrive at the destination.

Accordingly, the route generating unit 230 may create the personalized route information on the route between the departure point and the destination according to the departure point information and the destination information by connecting one or more walking route information and the unit route information according to the creation order when the user arrives at the destination based on the position information provided through the position information providing unit 210 and store the created personalized route information in the route DB 204 by matching the created personalized route information with the personal information corresponding to the user apparatus 100.

As described above, the service providing apparatus 200 for supporting creation of the route according to the embodiment of the present invention may automatically create personalized route information optimized in the movement route of the user while automatically tracing the position of the user.

Meanwhile, other user apparatus 101 other than the user apparatus 100 may provide the personalized route information created as described above and a use frequency of the personalized route information of other users is determined therethrough to provide personalized route information having a high use frequency as a formal recommended route through the route guide service providing apparatus 300 and this will be described in detail based on a configuration of FIG. 7.

Figure 7:
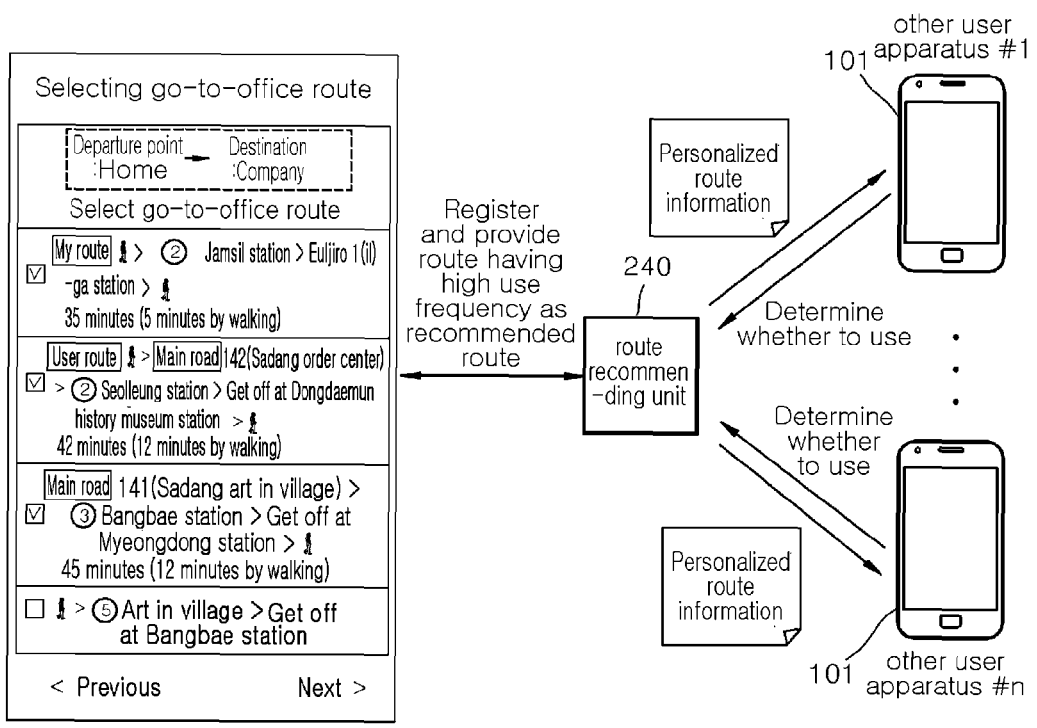
FIG. 7 is an exemplary diagram for sharing personalized route information of the service providing apparatus for supporting creation of the route according to the embodiment of the present invention.

As illustrated in FIG. 7, the route recommending unit 240 may store the personalized route information created to correspond to the user apparatus 100 in the route DB 204 and extract the personalized route information from the route DB 204 with respect to one or more other user apparatuses 101 that requests the route through the route guide service providing apparatus 300 by setting a departure point and a destination which are the same as departure point information and destination information included in the personalized route information and transmit the extracted personalized route information to each other user apparatus.

In this case, the route recommending unit 240 may extract the personalized route information including the departure point information and the destination information set by each other user apparatus 101 and provide the extracted personalized route information to the route guide service providing apparatus 300 and the route guide service providing apparatus 300 may provide the personalized route information to each other user apparatus 101 together with other recommended routes as illustrated in FIG. 7.

Further, the route recommending unit 240 may transmit a plurality of different personalized route information having the same departure point and destination with respect to the other user apparatus 101 that request the route information and created to correspond to different users to the other user apparatus 101 through the route guide service providing apparatus 300, of course.

Therefore, the personalized route information created to correspond to the user may be shared by a plurality of other users.

Further, the route recommending unit 240 may collect information indicating whether to use each personalized route information by interlocking with the route guide service providing apparatus 300 or directly from each other user apparatus 101 and thus, measure and accumulate and store the use frequency of each personalized route information stored in the route DB 204 and extract personalized route information of which the use frequency is equal to or more than a predetermined reference value and provide the extracted personalized route information to the route guide service providing apparatus 300.

As a result, the route guide service providing apparatus 300 may store the personalized route information of which the use frequency is equal to or more than the predetermined reference value as the recommended route and provide the stored personalized route information as the recommended route whenever different user apparatuses request the route.

Further, the route guide service providing apparatus 300 may provide the personalized route information set as the recommended route as a recommended route which takes precedence over other recommended routes.

Meanwhile, the route creating unit 230 provides the personalized route information created when the creation of the personalized route information is completed to the user apparatus to provide detailed contents of the personalized route information.

Further, the route creating unit 230 receives the user input information from the user apparatus 100 through the user interface to delete at least one of unit route information included in the personalized route information or receives edition information for changing selected line number information, get-on station information, and get-off station information to change the personalized route information based on the edition information and store the changed personalized route information in the route DB 204, of course.

As such, the service providing apparatus 200 for supporting the creation of the route according to the embodiment of the present invention support the personalized route only for the user to be created and supports multiple users to share personalized routes created by different users and registers and provides a route of which the use frequency is high as the recommended route to provide an optimized route to the user and provide the optimal route to the user by securing various routes. Meanwhile, some components of the service providing apparatus 200 for supporting the creation of the route according to the configuration may be constituted in the user apparatus 100 and implemented in an application form, of course. Therefore, the user may autonomously create and use a personalized route only therefor by using the user apparatus 100.

Figure 8:
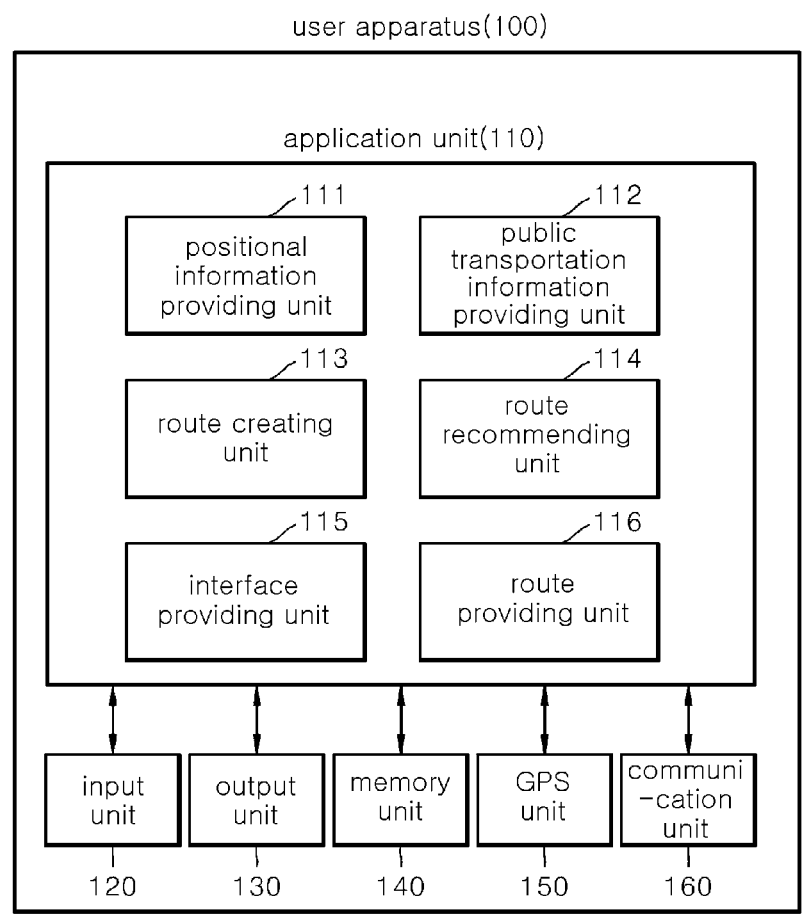
FIG. 8 is a configurational diagram of a user apparatus for service providing for supporting creation of a route according to the embodiment of the present invention.

When a detailed embodiment thereof is described in detail with reference to FIG. 8, the user apparatus 100 may include an application unit 110 including some components of the service providing apparatus 200 for supporting the creation of the route as illustrated in FIG. 8.

The application unit 110 may include a positional information providing unit 111, a public transportation information providing unit 112, a route creating unit 113, a route recommending unit 114, an interface providing unit 115, and a route providing unit 116.

In this case, the application unit 110 may be constituted by a control unit that controls an input unit 120 receiving input information of the user, an output unit 130 outputting output data through output means, a memory unit 140 storing various data, a GPS unit 150 measuring a current position, and a communication unit 160 communicating with the external apparatus and the control unit may be constituted by a micro controller unit (MCU).

Further, the input unit 120 receives a signal according to a button operation by the user or selection of a predetermined function or a command or control signal generated by an operation such as touching/scrolling a displayed screen or a signal corresponding to information input by the user and various devices including a keypad, a dome switch, a touch pad (capacitive/resistive), a touch screen, a jog wheel, a jog switch, a jog shuttle, a mouse, a stylus pen, a touch pen, and the like may be used.

Moreover, the output unit 130 may include at least one of a liquid crystal display (LCD), a thin film transistor-liquid crystal display (TFT LCD), an organic light-emitting diode (OLED), a flexible display, a 3D display, an electronic ink (e-ink) display, and a light emitting diode (LED).

The communication unit 160 communicates with a predetermined internal component or at least one predetermined external terminal via a wired/wireless communication network. In this case, the predetermined external terminal may include a network service system, a server, and the like. Further, the communication unit 160 may support wireless communication schemes including wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), wireless mobile broadband service (WMBS), Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, and the like. In addition, the communication unit 160 may support wired communication schemes including power line communication (PLC), USB communication, Ethernet, serial communication, an optical/coaxial cable, and the like.

According to the configuration, when each component constituting the application unit 110 is described, the interface providing unit 115 may first provide the user interface for setting the route through the output unit 130 at the time of activating the application unit 110 and receive the departure point information and the destination information and provide the received departure point information and destination information to the route providing unit 116.

The route providing unit 116 calculates the optimal route based on the map information stored in the memory unit 140 by receiving the departure point depending on the departure point information and the destination depending on the destination information to provide the route information regarding the route between the departure point and the destination through the user interface.

In this case, the interface providing unit 115 may receive a selection input for creating the route through the user interface so as for the user to autonomously create the route against a case in which there is no a route desired by the user in the route information provided through the route providing unit 116.

Therefore, the interface providing unit 115 may activate the route creating unit 113 at the time of receiving the selection input for creating the route according to the user input through the input unit 120 in the user interface output through the output unit 130. Further, the interface providing unit 115 may provide the departure point information and the destination information to the route creating unit 113.

The route creating unit 113 controls the public transportation information providing unit 112 at the time of receiving the departure point information and the destination information and the public transportation information providing unit 112 may receive the public transportation information by accessing a public transportation information providing server and thereafter, store the received public transportation information in the memory unit 140.

As a result, the route creating unit 113 may identify one or more adjacent stations positioned within a predetermined range based on the departure point depending on the departure point information by referring the map information prestored in the memory unit 140 and receive the public transportation information corresponding to each adjacent station by interlocking with the public transportation information providing unit 112 and store the received public transportation information in the memory unit 140.

Further, the route creating unit 113 may extract the line number information corresponding to each adjacent station from the public transportation information stored in the memory unit 140 and provide the extracted line number information through the user interface output to the output unit 130 and create the selected line number information as the selected line number information according to the user input through the input unit 120 in the corresponding user interface.

Next, the route creating unit 113 determines the adjacent station included in line information among the respective adjacent stations as the get-on station to create the get-on station information according to the line information included in the selected line number information and determines the station most adjacent to the destination among stations included in the line information as the get-off station to create the get-off station information.

In this case, the route creating unit 113 may receive and create the get-on station information, the get-off station information, and the selected line number information through the user input through the user interface.

As a result, the route creating unit 113 matches the get-on station information and the get-off station information with the selected line number information to create the unit route information including the get-on station information, the get-off station information, and the selected line number information.

In this case, the route creating unit 113 may measure a distance or a time depending on walking movement to the destination from the get-off station depending on the get-off station information including in the unit route information at the time of creating the unit route information by referring the map information and when the measured distance or time is equal to or more than a predetermined reference value, the route creating unit 113 may set the get-off station as the departure point by interlocking with the public transportation information providing unit 112 and provide the line number information corresponding to each adjacent station within a predetermined range based on the departure point (get-off station) through the user interface output to the output unit 130.

Therefore, the route creating unit 113 may create additional unit route information to set the get-off station as the departure point by the same scheme as a creation process of the unit route information.

Further, the route creating unit 113 may create another additional unit route information to set the get-off station depending on the get-off station information included in the additional unit route information as the departure point as described above, of course when the distance or time depending on the walking movement to the destination from the get-off station depending on the get-off station information included in the additional unit route information is equal to or more than a predetermined reference value.

As a result, the route creating unit 113 may connect one or more additional unit route information subsequently to the unit route information sequentially according to a creation order.

Meanwhile, the route creating unit 113 creates walking route information calculated based on walking with respect to residual routes not connected through at least one of the unit route information and the additional unit route information when the distance or the time depending on the walking movement to the destination from the get-off station depending on any one of the unit route information and the additional unit route information created last is less than a predetermined reference value to create the personalized route information regarding the route between the departure point and the destination depending on the departure point information and the destination information and store the created personalized route information in the memory unit 140.

As a result, the route recommending unit 114 may be activated by the route providing unit 116 at the time of providing the route information by setting the departure point and the destination through the route providing unit 116 and extract the personalized route information corresponding to the departure point information and the destination information input through the user interface from the memory unit 140 and output through the output unit 130 together with the recommended route through the route providing unit 116.

Therefore, the user may be guided with the route by using the personalized route information autonomously created thereby in addition to the recommended route and guided with the optimized route.

Meanwhile, the user apparatus 100 constituted by the application unit 110 according to the embodiment of the present invention support the personalized route only for the user to be created by tracing a movement route of the user and to this end, the application unit 110 may further include the positional information providing unit 111.

The positional information providing unit 111 measures a current position of the user apparatus 100 through the GPS unit 150 to create the positional information.

The interface providing unit 115 may receive the departure point information and the destination information as described above and provide the user interface for creating the personalized route information through the output unit 130.

As a result, the interface providing unit 115 may activate the route creating unit 113 at the time of receiving the selection input for creating the personalized route information and provide the departure point information and the destination information to the route creating unit 113.

Thereafter, the route creating unit 113 may create the personalized route information while tracing the movement route of the user for creating the personalized route information.

First, the route creating unit 113 measures a movement speed depending on a positional change by interlocking with the positional information providing unit 111 at the time of receiving the departure point information and when the measured movement speed is equal to or less than a predetermined reference speed, the route creating unit 113 may create the walking route information by determining that the user moves through the walking.

Thereafter, the route creating unit 113 may determine a get-on time when the user reaches a bus station or a subway station by moving from the departure point and there is no positional change of the user for a predetermined time or more based on the positional change measured by interlocking with the positional information providing unit 111 or the user gets on a bus or a subway and the movement speed of the user increases, and as a result, a speed change is more than a predetermined reference speed for a predetermined time.

As a result, the route creating unit 113 may identify each of one or more adjacent stations positioned within a predetermined range by referring the map information based on the position at the corresponding get-on time as illustrated in FIG. 4 and extract the line number information corresponding to each adjacent station from the memory unit 140 by interlocking with the public transportation information providing unit 112 and provide the extracted line number information through the user interface output through the output unit 130.

Next, the route creating unit 113 sets the adjacent station that matches the station included in the line information as the get-on station based on the line information included in the selected line number information selected according to the user selection in the line number information to create the get-on station information.

Further, the route creating unit 113 determines a time when a difference between a route depending on the line information and a movement route depending on current positional information occurs as getting-off based on the positional information provided from the positional information providing unit 111 with respect to the user moves while getting on the bus or the subway to create a station most adjacent to the current position measured through the positional information providing unit 111 among the stations included in the line information at the corresponding time as the get-off station information.

In this case, the route creating unit 113 may receive the get-on station information and the get-off station information from an access point (AP) installed in the station through the communication unit 160.

Further, the public transportation information providing unit 112 provides driving information for each public transportation means and determines the get-on station and the get-off station based on the positional information and the driving information for each public transportation means to create the get-on station information and the get-off station information.

Moreover, the route creating unit 113 accumulates and stores the positional information provided through the positional information providing unit 111 at the get-on time determined as the getting-on in the configuration to calculate the movement route and accumulates the positional information provided through the positional information providing unit 111 in the line information of each line number information provided through the public transportation information providing unit 112 to automatically select the line number information corresponding to the line information which matches the calculated movement route information.

Therefore, the route creating unit 113 automatically selects the line number which matches the movement route of the user to create the selected line number information without the need of providing the line number information to the user apparatus 100.

Meanwhile, the route creating unit 113 may create the unit route information including the get-on station information, the get-off station information, and the selected line number information that match the selected line number together with the get-on state information at the time of creating the get-off station information.

Thereafter, the route creating unit 113 may create other walking route information or other unit route information according to the configuration when the user continuously moves while the user does not reach the destination based on the positional information provided through the positional information providing unit 111.

As a result, the route creating unit 113 connects one or more walking route information and unit route information according to the creation order when the user reaches the destination based on the positional information provided through the positional information providing unit 111 to create the personalized route information for the route between the departure point and the destination depending on the departure point information and the destination information and store the created personalized route information in the memory unit 140.

Therefore, the route recommending unit 114 may be activated by the route providing unit 116 at the time of activating the route providing unit 116 and the route recommending unit 114 may extract the personalized route information corresponding to the departure point information and the destination information by receiving the departure point information and the destination information from the route providing unit 116 and provide the personalized route information together with other recommended routes through the route providing unit 116.

As described above, the service providing apparatus 200 for supporting creation of the route according to the embodiment of the present invention may automatically create the personalized route information optimized to the movement route of the user while automatically tracing the position of the user.

Meanwhile, in the configuration, the route recommending unit 114 may collect information indicating whether to use each personalized route information stored in the memory unit 140, therefore, the route recommending unit 114 may measure and accumulate and store the use frequency of each personalized route information stored in the memory unit 140 and thereafter, extract the personalized route information of which the use frequency is equal to or more than a predetermined reference value and store the extracted personalized route information in the memory unit 140 as the recommended route information.

As a result, the route providing unit 116 may provide the personalized route information stored in the memory unit 140 as the recommended route information as the recommended route together with other recommended routes at the time of receiving the departure point information and the destination information.

Further, the route providing unit 116 may provide the personalized route information stored as the recommended route which takes precedence over other recommended route information, of course.

Meanwhile, the route creation unit 113 provides the personalized route information created when the creation of the personalized route information is completed through the user interface output to the output unit 130 to provide detailed contents of the personalized route information.

As a result, the route creation unit 113 receives the user input information through the user interface to delete at least one of the unit route information included in the personalized route information or receives edition information for changing selection line number information, the get-on station information, and the get-off station information to change the personalized route information based on the edition information and store the changed personalized route information in the memory unit 140, of course.

Various apparatuses and components described in the specification may be implemented by a hardware circuit (for example, a CMOS based logic circuit), firmware, software, or a combination thereof. For example, various apparatuses and components may be implemented by using a transistor, a logic gate, and an electronic circuit in the form of various electric structures.

Figure 9:
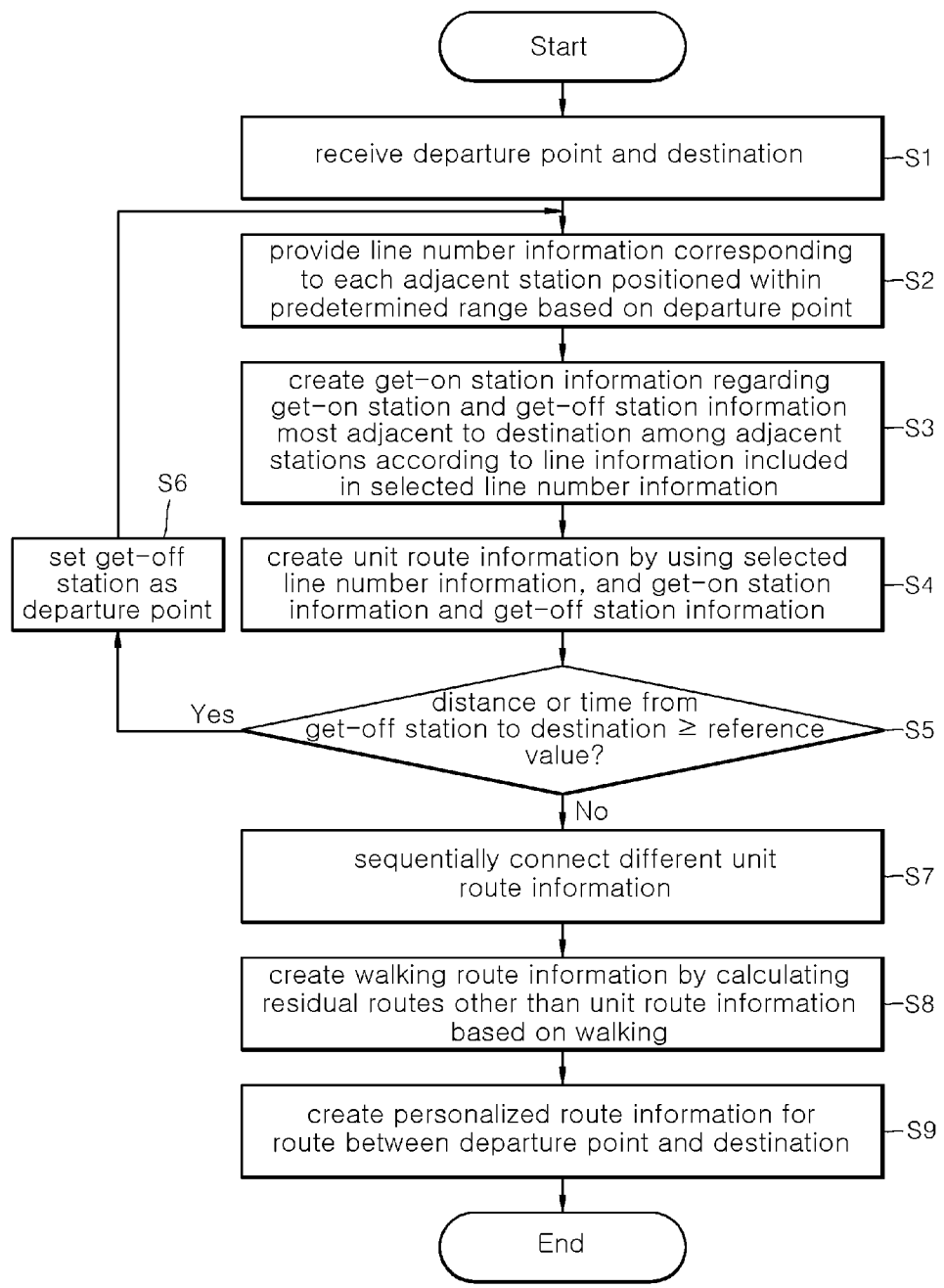
FIG. 9 is a flowchart for a service providing method for supporting creation of a route according to another embodiment of the present invention.

FIG. 9 is a flowchart for a service providing method for supporting creation of a route according to another embodiment of the present invention and as illustrated in FIG. 9, the service providing apparatus 200 for supporting creation of the route that communicates with the user apparatus 100 receives the departure point information and the destination information from the user apparatus 100 to provide the user interface for creating the path between the departure point and the destination to the user apparatus 100 (S1).

Thereafter, the service providing apparatus 200 for supporting creation of the route may transmit to the user apparatus 100 the line number information regarding the line number for each of one or more public transportation means passing through each adjacent station within the predetermined range based on the departure point by referring to the map information and provide the transmitted line number information through the user interface (S2).

Next, the service providing apparatus 200 for supporting creation of the route may create the get-on station information regarding the get-on station and the get-off station information regarding the get-off station most adjacent to the destination among the adjacent stations according to the line information included in the selected line number information in the line number information (S3) and thereafter, match the get-on station information and the get-off station information with the selected line number information and create the get-on station information and the get-off station information matching the selected line number information as the unit route information (S4).

In this case, the service providing apparatus 200 for supporting creation of the route measures the distance or the time depending on the walking movement from the get-off station to the destination and when the measured distance or time is equal to or more than a predetermined reference value (S5), the service providing apparatus 200 for supporting creation of the route sequentially creates one or more additional unit route information to set different get-off stations as the departure point until the distance or time is less than the reference value (S6) and thereafter, sequentially connect the created additional unit route information subsequently to the unit route information (S7).

As a result, the service providing apparatus 200 for supporting creation of the route creates residual routes not connected through the unit route information and the additional unit route information as one or more walking route information calculated based on walking (S8) to create the personalized route information for the route between the departure point and the destination depending on the departure point information and the destination information (S9) and provide the personalized route information together with other recommended route.

The service providing method for supporting creation of the route according to the embodiment of the present invention may be prepared with a computer program, and codes and code segments configuring the computer program may easily deduced by a computer programmer in the art. Further, the corresponding computer program is stored in a non-transitory computer readable storage medium, and read and executed by the computer or the user apparatus, the service providing apparatus, and the like according to the embodiment of the present invention to implement the service providing method for supporting creation of the route.

The non-transitory computer readable storage medium includes a magnetic storage medium, an optical storage medium, and a carrier wave medium. The computer program implementing the service providing method for supporting creation of the route according to the embodiment of the present invention may be stored and installed in embedded memories of the user apparatus and the service providing apparatus. Alternatively, external memories such as a smart card storing and installing the computer program implementing the service providing method for supporting creation of the route according to the embodiment of the present invention may be installed on the user apparatus and the service providing apparatus through an interface.

The present invention can be applied to various fields such as a navigation system, a transportation information providing system, and an LBS-based system by supporting an optimal route which is known by a user to be directly created by the user when there is no user's desired route among recommended routes according to a route request of the user, providing the created personalized route together with the recommended route to support the personalized route to be guided as the optimal route, and simultaneously, providing various routes using the public transportation to ensure expandability of route provision.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

What is claimed is:

1. A service providing apparatus for supporting creation of a route, the service providing apparatus comprising:
    a public transportation information providing unit configured to provide line number information indicating line numbers of one or more public transportation means usable at a departure point on a map displayed on a user interface, the line number information including information of adjacent stations in a predetermined range from the departure point input through the user interface, wherein the line number information is provided by referring to information of the map and public transportation information which are prestored in a memory unit; and
    a route creating unit configured to
        create information of a personalized route for a user based on a destination, a public transportation used to the destination, a get-on station and a get-off station, when (i) the destination is selected by the user through the user interface, (ii) a public transportation to reach the destination is selected from among the one or more public transportation means, and (iii) the get-on station and the get-off station to be used on the personalized route are each selected from among the stations provided from the line number information at departure point, wherein the information of the personalized route includes information of the selected route,
    wherein in creating the information of the personalized route, the route creating unit is configured to sequentially create
        (i) specific line number information corresponding to a specific line number among the line numbers included in the line number information, when the user selects the specific line number,
        (ii) information of the get-on station and information of the get-off station based on the adjacent stations and the destination, and
        (iii) information of one or more routes usable for the one or more public transportation means between the departure point and the destination based on the specific line number information, the information of the get-on station and the information of the get-off station until a distance or a time measured based on walking from the get-off station to the destination is less than a predetermined reference value, wherein the one or more routes is created by matching to the specific line number information, and
    generate information of walking route between the get-off station and the destination, and
    create the information of the personalized route between the departure point and the destination by using the information of the one or more routes and the information of the walking route.

2. The service providing apparatus of claim 1, wherein the route creating unit receives edition information created in order to delete at least one of route information included in the information of the personalized route or change at least one of the line number information, the information of the get-on station, and the information of the get-off station based on user input through the user interface and changes the information of the personalized route based on the edition information.

3. The service providing apparatus of claim 1, further comprising:
    a route recommending unit configured to
    match and store the information of the personalized route with personal information of a user apparatus provided by the user interface when creating the information of the personalized route and
    provide the information of the personalized route to the user apparatus and a plurality of different user apparatuses which select the departure point and the destination.

4. The service providing apparatus of claim 3, wherein the route recommending unit configured to
    measure a use frequency by receiving information on whether to use the information of the personalized route from the user apparatus and the plurality of different user apparatuses and
    provide the information of the personalized route as recommended route information prior to other routes to the user apparatus selecting the departure point and the destination when the use frequency is more than a predetermined value.

5. A service providing method for supporting creation of a route, the service providing method comprising:
    providing a user interface for creating a route between a departure point and a destination to a user apparatus;
    providing line number information indicating line numbers of one or more public transportation means usable at a departure point on a map displayed on a user interface, the line number information including information of adjacent stations in a predetermined range from the departure point input through the user interface, wherein the line number information is provided by referring to information of the map and public transportation information which are prestored in a memory unit; and
    creating information of a personalized route for a user based on a destination, a public transportation used to the destination, a get-on station and a get-off station, when (i) the destination is selected by the user through the user interface, (ii) a public transportation to reach the destination is selected from among the one or more public transportation means, and (iii) the get-on station and the get-off station to be used on the personalized route are each selected from among the stations provided from the line number information at departure point, wherein the information of the personalized route includes information of the selected route;
    wherein the creating of the information of the personalized route comprising:
    sequentially creating
        (i) specific line number information corresponding to a specific line number among the line numbers included in the line number information, when the user selects the specific line number,
(ii) information of the get-on station and information of the get-off station based on the adjacent stations and the destination, and
(iii) information of one or more routes usable for the one or more public transportation means between the departure point and the destination based on the specific line number information, the information of the get-on station and the information of the get-off station until a distance or a time measured based on walking from the get-off station to the destination is less than a predetermined reference value, wherein the one or more routes is created by matching to the specific line number information;

generate information of walking route between the get-off station and the destination; and creating the information of the personalized route between the departure point and the destination by using the information of the one or more routes and the information of the walking route.

* * * * *